United States Patent [19]

Bauer et al.

[11] Patent Number: 4,736,484

[45] Date of Patent: Apr. 12, 1988

[54] WINDSHIELD WIPER SYSTEM

[75] Inventors: Kurt Bauer, Ingersheim; Herbert Bienert, Besigheim; Bruno Egner-Walter, Heilbronn; Eckhardt Schmid, Brackenheim; Volker Tietz, Vohringen, all of Fed. Rep. of Germany

[73] Assignee: SWF Auto-Electric GmbH, Bietigheim-Bissingen, Fed. Rep. of Germany

[21] Appl. No.: 881,397

[22] Filed: Jul. 2, 1986

[30] Foreign Application Priority Data

Jul. 2, 1985 [DE] Fed. Rep. of Germany ....... 3523546

[51] Int. Cl.⁴ ................................................. B60S 1/34
[52] U.S. Cl. .................................. 15/250.2; 15/250.34
[58] Field of Search .............. 15/250.2, 250.19, 250.34

[56] References Cited

U.S. PATENT DOCUMENTS 4,370,774 2/1983 Bienert et al. ..................... 15/250.2

FOREIGN PATENT DOCUMENTS 3314456 10/1984 Fed. Rep. of Germany ..... 15/250.2
160637 12/1980 Japan ................................. 15/250.2

Primary Examiner—Peter Feldman
Attorney, Agent, or Firm—James B. Raden; Robert P. Seitter

[57] ABSTRACT

In a windshield wiper system for motor vehicles the contact pressure of the wiper onto the window is adjustable while the wiper is moving. For this purpose a multi-part actuator driven by an electromotive adjusting device and guided in a bore of the wiper shaft is axially displaced. The multi-part construction of this actuator compensates for faulty alignment, so that the adjusting mechanism operates with a good efficiency and enables rapid adjusting times.

6 Claims, 3 Drawing Sheets

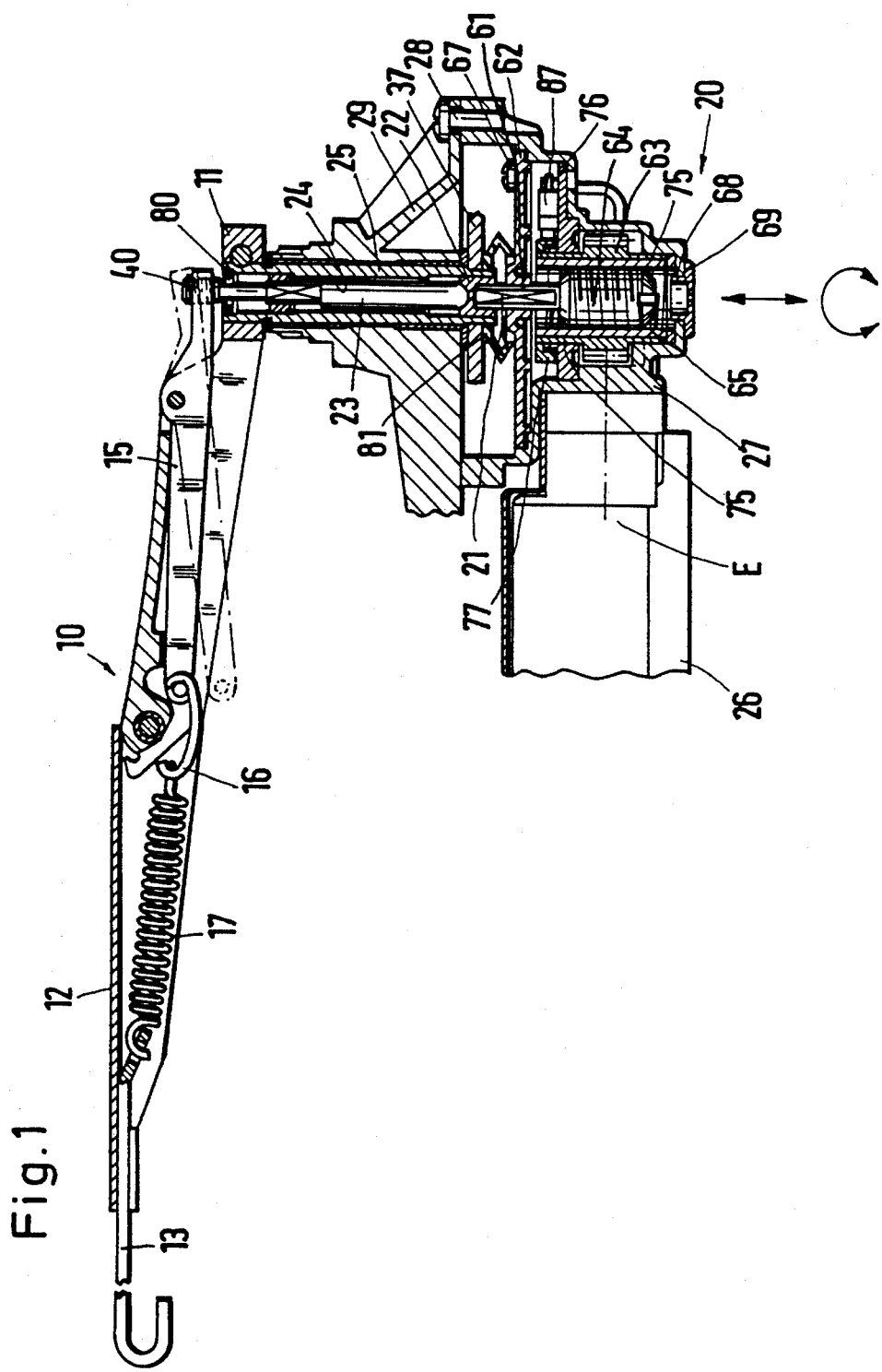

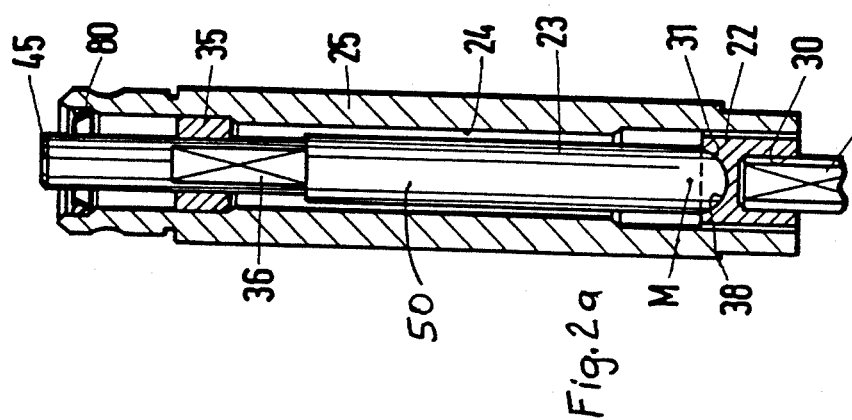
Fig.2a Fig.2d
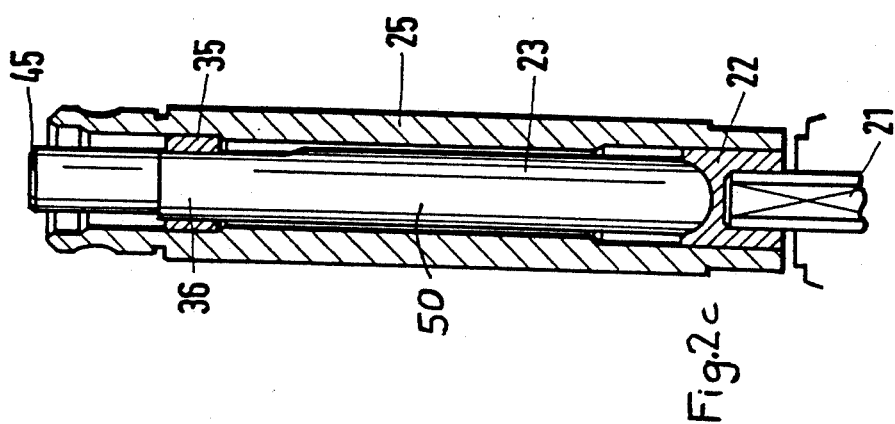
Fig.2c Fig.2e
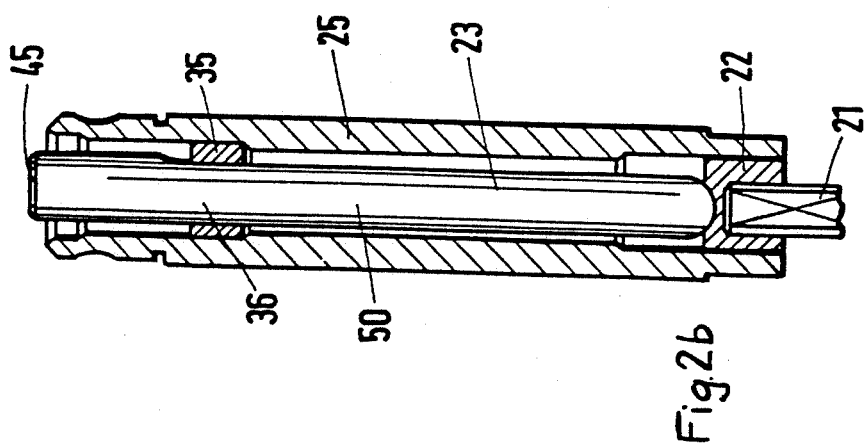
Fig.2b Fig.2f

WINDSHIELD WIPER SYSTEM

BACKGROUND OF THE INVENTION

This invention pertains to a windshield wiper system in which the wiper contact pressure on the window is adjustable.

German specification OS No. 3,314,456 describes a windshield wiper system in which the contact pressure of the wiper blade is adjusted by an actuator. The actuator is an adjusting rod guided in a bore of the wiper shaft, and is driven electromotively to vary the suspension point of a contact pressure spring of the wiper arm by way of a lever. The actuator includes sections formed as a toothed rack which meshes with a pinion. The actuator is thereby formed as a single piece and extends from the gear housing of the actuating drive through the wiper shaft to the working point on the lever, on which the contact pressure spring is suspended.

This adjusting mechanism occupies a relatively large space and does not have good efficiency. Short adjusting times cannot be achieved.

Smooth guidance of the relatively long actuator can not be ensured due to unavoidable tolerances. Thus in this construction relatively high friction has to be expected, so that accordingly high adjusting forces are needed and the motor has to be accordingly high-powered. If in the worst case the actuator locks, then the motor may be blocked and possibly destroyed.

SUMMARY OF THE INVENTION

The present invention is based on the problem of developing a windscreen wiper system of the initially mentioned kind such that with a relatively low-powered motor short adjusting times can be achieved, and wherein the adjusting mechanism is of compact construction and has a high efficiency. Furthermore the operability is to be ensured also after a longer service time.

In accordance with the invention a multi-part actuator is axially displaced by an electromotive adjusting device and is guided in a bore of the wiper shaft.

In accordance with the invention the actuator is divided into at least two parts, namely a tappet being part of the actuating drive and an adjusting rod acting upon the lever and axially extending through almost the entire wiper shaft. Thus the known integral actuator is divided at the intersection between actuating drive and wiper shaft. This intersection place is selected, because, when the actuating drive is mounted, small deviations from the intended position relative to the wiper shaft can indeed be admitted without diminishing the efficiency of the system because of increased friction losses.

Further in accordance with the invention a flexible connecting element is provided between the tappet and the adjusting rod to compensate for alignment faults and inclination faults between the tappet and the adjusting rod. A flexible connecting element is an element which admits certain relative adjusting movements between the two parts. In the present case a rigid connecting element is not suitable, because it is not capable of compensating for alignment faults and thus the disadvantage of the aforedescribed prior construction with regard to increased friction losses will not be eliminated. Because of the two-part construction the endurance run stability can also be substantially improved in comparison with the prior construction.

In the prior construction the actuator must be fixed in a manner protected against twisting, while the lever supported on the front face moves to and fro with the wiper arm. Therefore increased wear has to be expected which also results in inaccuracies with regard to the adjustment of the prescribed contact pressure.

Further in accordance with the invention the adjusting rod is coupled with the wiper shaft in a manner protected against twisting. Thus no wear can appear at the supporting face due to a relative rotation between lever and front face of the adjusting rod. The heavily loaded supporting face is now moved into the bore of the wiper shaft, where it is protected against external influences and can be lubricated in a lasting way, so that good running properties without wear can also be expected after a longer service time.

The efficiency of the entire adjusting mechanism is also increased in that the tappet of the actuating drive is guided in a manner protected against twisting and its adjusting stroke is derived from the rotation of a drive wheel by way of a screw gear. In this case a particularly compact construction is possible, when the tappet is connected in a manner protected against twisting with a thread portion having an external thread, which thread portion is arranged in a thread sleeve and meshes with the internal thread of the said thread sleeve, wherein the said sleeve is connected with the drive wheel in a manner protected against twisting, especially is integrated in the latter. By the dislocation of the screw thread inside the worm wheel in particular the overall length in the adjusting direction is substantially reduced.

BRIEF DESCRIPTION OF THE DRAWING

The invention will be better understood from a reading of the following detailed description in conjunction with the drawing in which:

FIG. 1 is a sectional view through the actuating drive, wiper shaft and wiper arm of a wiper system;

FIGS. 2a, 2b and 2c show three different partial sections through the wiper shaft;

FIGS. 2d and 2e are cross sections of adjusting rods 23 in FIGS. 2a and 2c, respectively;

FIG. 2f shows a cross section of adjusting rod 23 of FIG. 2b;

DETAILED DESCRIPTION

Figure 3:
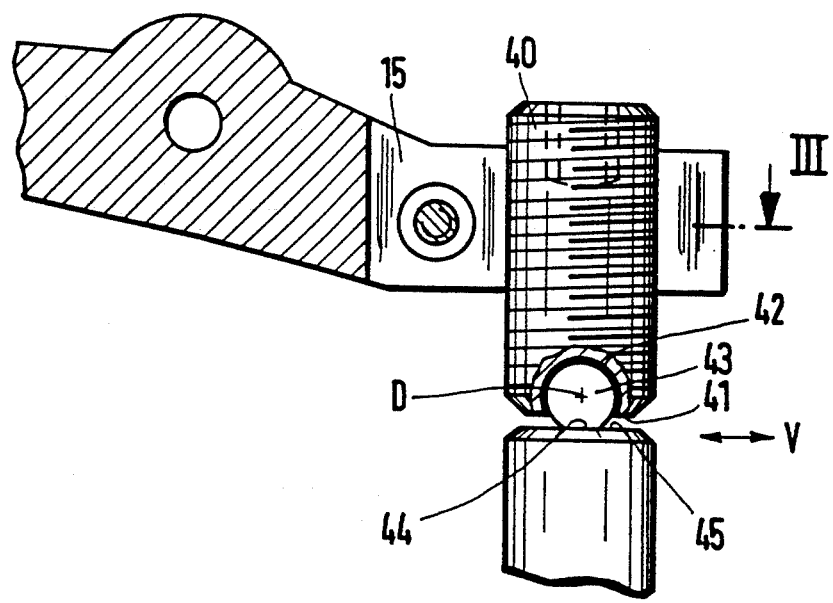
FIG. 3 shows schematically and on an enlarged scale a partial section in the area of the connection between lever and adjusting rod.

Wiper arm 10 includes a fastening member 11 and a link 12 swivellably articulated thereon. A wiper rod 13 is fixed on link 12. A lever 15 is swivellably mounted on the fastening member 11. On the end of lever 15 a C-yoke 16 is suspended. A contact pressure spring 17 serves as a spring element for producing the necessary contact pressure between the wiper blade (not shown in the drawing) and the window pane to be cleaned. Contact pressure spring 17 is suspended on the wiper rod 13 and on the C-yoke 16. The contact pressure to be produced by the said contact pressure spring 17 is adjustable. If lever 15 is swivelled into the position indicated by broken lines, the contact pressure is increased.

The adjustment of the contact pressure is effected by way of an actuating drive 20. Part of actuating drive 20 is a tappet 21, which is displaceable in the axial direction, but otherwise it is guided in a manner protected against twisting. The adjusting stroke of the said tappet 21 is transmitted onto an adjusting rod 23 by way of a connecting element 22 in the shape of a bushing. The adjusting rod 23 is axially displaceably mounted in a bore 24 of a wiper shaft 25. Adjusting rod 23 acts upon the free end of the lever 15.

Thus it can be seen that according to the invention the actuator between the actuating drive 20 and the lever 15 is made of several parts. In the embodiment shown it includes the adjusting rod 23 and the tappet 21, which are coupled with each other by way of the flexible connecting element 22. The significance of the flexible connecting element and the two-part construction of the actuator will be described hereinbelow.

Electric motor 26 and a gear housing 27 is part of the actuating drive 20. The gear housing 27 is flanged onto the bearing bushing 29 for the wiper shaft 25 by way of screw connections. In an experimental production of the wiper system it became obvious that the prescribed position of this structural unit of electric motor 26 and gear housing 27 relative to the bearing bush 29 can only be accurately adhered to with special care. Normally dislocations will occur due to unavoidable tolerances, so that it cannot be ensured that the axis of the tappet 21 is exactly aligned with the wiper shaft 25. However the unavoidable alignment and inclination faults are compensated for by the measures described below.

The bushing 22, to be regarded as a flexible connecting element, has on one side a recess 30 for the end of the tappet 21 as can more detailed be seen from FIG. 2a. The end of the tappet has a four-edged cross-section which is fittingly seated in recess 30, so that the bushing 22 is coupled with the tappet 21 in a manner protected against twisting. On the other side bushing 22 has a recess 30 shaped in the manner of a universal ball joint for the correspondingly formed crowned end portion of adjusting rod 23.

As shown in FIG. 2a the center M of the crowned portion of the universal ball joint lies outside the bushing 22, so that between the adjusting rod 23 and the bushing 22 a compensating swivelling motion is possible. This would not be necessary if a more cone shaped widening were used. Furthermore angular faults can be compensated for in that the bushing 22 is displaceably guided with lateral play in the bore 24 of the wiper shaft 25.

It is essential for high endurance run stability that the flexible connecting element, namely the bushing 22, is arranged inside the bore 24 of the wiper shaft 25. It is furthermore important that the bushing 22 is arranged close to the end of the wiper shaft 25 which is opposite the wiper arm 10, so that the tappet 21 being part of the actuating drive dips only slightly into the bore 24 of the wiper shaft 25. A guide bushing 35 is pressed into bore 24 close to the end of the wiper shaft 25 facing the wiper arm. In its portion guided by guide bushing 35 the adjusting rod 23 has a cross-section differing from the shape of a circle in that it has a four-edge profile. The cross-section of the bearing surface of the guide bushing 35 is adapted to the cross-section of the adjusting rod 23. In this manner adjusting rod 23 is coupled with wiper shaft 25 in a manner protected against twisting. When the wiper shaft 25 is driven in pendulum fashion by way of the crank 37 indicated in FIG. 1, adjusting rod 23 also moves in pendulum fashion, while the tappet 21 and thus also the bushing 22 connected with it in a manner protected against twisting stand still. The result is friction on the supporting face 38 between the crowned end portion of the adjusting rod 23 and the recess 31 on the bushing 22. However in this place the frictional losses can be restricted to a minimum and extreme loading on this supporting face 38 is not expected. Supporting face 38 is protected against environmental influences inside the bore 24 of the wiper shaft 25. Corrosion in this place is not expected because bore 24 is sealed on both sides as will be described below. Moreover because grease can be put into this bore and thus into the area of the supporting face 38 friction losses are low. Finally, due to the crowned development of the end portion of the adjusting rod 23, a large supporting face 38 is provided. All these measures affect the endurance run stability of the adjusting mechanism in a positive way.

Figure 4:
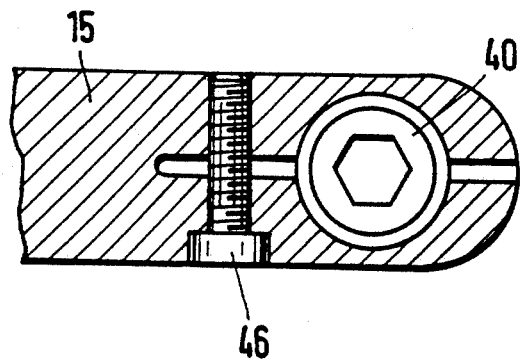
FIG. 4 is a partial section taken on the line III of FIG. 3 through the lever on the wiper arm.

As seen in FIGS. 3 and 4 adjusting screw 40 is provided on the lever 15 for an accurate adjustment or re-adjustment of the contact pressure. The front face 41 of adjusting screw 40 has a recess 42, in which a supporting body 43 in the shape of a ball portion is movably mounted. Planar supporting surface 44 rests upon the front face 45 of the adjusting rod 23. FIG. 4 shows that the end area of the lever 15 is slotted and the two parts can be braced relative to each other by means of a screw 46 and thereby lock the adjusting screw 40. In this embodiment it is important that with a change in the position of the lever 15 relative to the fastening member of the wiper arm the supporting body 43 is automatically adjusted in such a way that its supporting face 44 rests flush upon the front face 45. Due to the relatively large supporting face relatively low surface pressure is exerted so that wear is minimal when the supporting surface 44 is slightly linearly displaced on the front face 45 of the adjusting rod 23 in an adjusting action of the lever 15. Thus high adjusting accuracy can be expected also after a long service time. Theoretically the supporting body 43 could be removably inserted into the recess 42. However, to facilitate mounting the supporting body is locked in receiver 42 because the swivel and center point D of the supporting body is positioned within the adjusting screw 40.

The differences between the embodiments according to FIGS. 2a to 2c will be briefly described below:

In the embodiment of FIG. 2b the cross-section of adjusting rod portion 50 between the guide bushing 35 and the bushing 22 supported on the tappet 21 is no larger than guide portion 36. Consequently the adjusting rod 23 can be inserted into the bore of the wiper shaft 24 from the wiper side without any problems. Furthermore the adjusting rod has a flattened profile as has been indicated in FIG. 2f.

In the embodiment of FIG. 2c the cross-section of adjusting rod portion 50 between the guide bushing 35 and the bushing 22 supported on the tappet 21 is larger than that of guide portion 36 as shown in FIG. 2e. The adjusting rod has therefore to be inserted into the bore 24 of the wiper shaft 25 from the side of the drive. In the embodiment of FIG. 2a, adjusting rod portion 36 is of approximately square cross section. As shown in FIG. 2d adjusting rod portion 50 is of larger cross section and adjusting rod 23 must therefore be inserted into bore 24 from the drive side. These embodiments have the advantage that during transportation of the wiper system, during which the wiper arm is normally not yet fixed onto the wiper shaft, the adjusting rod cannot glide out of the wiper shaft.

The design of actuating drive 20 will now be described in detail with reference to FIG. 1, which design has a particularly solid construction with good efficiency. The tappet 21 has a cross-section differing from the shape of a circle, namely a four-edged profile, which extends through a corresponding arperture 61 in a cap 62 closing the gear housing 27. Thus tappet 21 is guided in a manner protected against twisting. Its adjusting stroke is derived from a reversible rotation of a drive wheel 63 by way of a screw gear, which meshes with a worm in a manner not shown in detail. The worm is driven by electric motor 26. Integrally connected to tappet 21 is a thread portion 64 of larger cross-section which has an external thread. Portion 64 is connected to tappet 21 in a manner protected against twisting. A thread sleeve 65 having an internal thread which meshes with the thread portion 64 is pressed into a bore of drive wheel 63. In this construction it is essential that thread sleeve 65 is integrated into the drive wheel 63 in a manner protected against twisting and that it is preferably symmetrically arranged to the center plane E of drive wheel 63. Thus, rotation of drive wheel 63 displaces thread portion 64 and therefore tappet 21 is also axially displaced inside the said drive wheel, so that the overall height of the actuating drive 20 is not enlarged.

Cap 62 may be clamped by screw connections 67 to the flange on gear housing 27 in different angular positions relative to the gear housing 27. When the screw connections 67 are detached, the tappet 21 can be rotated together with the cap 62 and thus its basic position can be adjusted. For this purpose an opening 68 is provided on the gear housing 27 in the axial direction of the tappet 21. Opening 68 may be closed by a cap 69. A tool can be inserted into opening 68 and engage a slot of the thread portion 64 for transmitting a rotation onto the tappet 21. Thus it is possible to adjust the tappet even if the entire structural unit has been screwed onto the mounting frame or onto the wiper bearing, because the screws 67 for force-fitting the cap are still accessible.

From FIG. 1 can furthermore be seen that the drive wheel 63 has a cylindrical stud on each one of its two sides. One stud is fitted in a corresponding bearing bore in the gear housing. The other stud is fitted in a bearing bore in an endshield 76, which is secured in the gear housing 27 in a manner protected against twisting. On a portion of the stud 75 protruding over the endshield 76 a cam disk 77 and thus a signal is conducted to an evaluation circuit not shown in detail, from which signal the adjusting stroke of the tappet can be derived. This switch 87 is in a space-saving way arranged between the endshield 76 and the gear housing cap 62 and thus protected against environmental influences.

Finally it is also pointed out that the bore 24 in the wiper shaft 25 is on the one hand sealed by a seal 80 and on the other hand by a rubber cushion 81 which is supported on the crank 37 for driving the wiper shaft or on the gear housing cap 62. Thus the said rubber cushion also seals the bearing surface of the tappet 21 in the gear housing cap 62.

What is claimed is:

1. A windshield wiper system comprising:
a fastening member fixed on a wiper shaft;
a link articulated on said fastening member;
a spring element acting between said fastening member and said link;
a lever acting upon said spring element;
an actuating drive;
an actuator displaceable within a bore of said wiper shaft;
said actuator comprising a plurality of parts including a tappet and an adjusting rod acting upon said lever, thereby the contact pressure for a wiper blade produced by said spring element is variable by said actuating drive moving said tappet in an adjusting stroke which is transmitted onto said lever by said actuator;
a flexible connecting element transmitting the adjusting stroke of said tappet onto said adjusting rod;
wherein said flexible connecting element is arranged inside said wiper shaft bore;
wherein said flexible connecting element is arranged inside said bore close to the end of said wiper shaft opposite said fastening member; and,
wherein:
said connecting element includes a second bushing which on one side has a first recess for one end of said tappet and has on its other side a second recess for receiving the end of said adjusting rod, wherein said second recess is formed as a universal ball joint, into which engages a correspondingly shaped crowned end portion of said adjusting rod.

2. A windshield wiper system in accordance with claim 1, wherein:
the center of said crowned portion or of the universal ball joint lies outside said second bushing; and
said second bushing is displaceably mounted with lateral play in said bore.

3. A windshield wiper system comprising:
a fastening member fixed on a wiper shaft;
a link articulated on said fastening member;
a spring element acting between said fastening member and said link;
a lever acting upon said spring element;
an actuating drive;
an actuator displaceable within a bore of said wiper shaft;
said actuator comprising a plurality of parts including a tappet and an adjusting rod acting upon said lever, whereby the contract pressure for a wiper blade produced by said spring element is variable by said actuating drive moving said tappet in an adjusting stroke which is transmitted onto said lever by said actuator;
an adjusting screw on the said lever, said adjusting screw having a recess in its front face; and
a supporting body in the shape of a ball portion movably mounted in said recess, said supporting body having a planar supporting face resting upon the front face of said adjusting rod.

4. A windshield wiper system in accordance with claim 3, wherein said supporting body is movably locked in said adjusting screw recess.

5. A windshield wiper system comprising:
a fastening member fixed on a wiper shaft;
a link articulated on said fastening member;
a spring element acting between said fastening member and said link;
a lever acting upon said spring element;
an actuating drive;
an actuator displaceable within a bore of said wiper shaft;
said actuator comprising a plurality of parts including a tappet and an adjusting rod acting upon said lever, whereby the contact pressure for a wiper blade produced by said spring element is variable by said actuating drive moving said tappet in an adjusting stroke which is transmitted onto said lever by said actuator;

wherein: said tappet is guided in a manner protected against twisting, said actuating drive including a drive wheel driver by way of a screw gear; and the adjusting stroke of said tappet is derived from rotation of said drive wheel by way of said screw gear;

wherein said tappet has a cross-section differing from the shape of a circle, and is guided in a manner protected against twisting in a corresponding aperture in a cap covering a gear housing; and, wherein:

said cap may be fixed in different angular positions relative to said gear housing and that in the axial direction of said tappet said gear housing has a closable opening through which the position of said tappet can be pre-adjusted by means of a tool.

6. A windshield wiper system comprising:
a fastening member fixed on a wiper shaft;
a link articulated on said fastening member;
a spring element acting between said fastening member and said link;
a lever acting upon said spring element;
an actuating drive;
an actuator displaceable within a bore of said wiper shaft;
said actuator comprising a plurality of parts including a tappet and an adjusting rod acting upon said lever, whereby the contact pressure for a wiper blade produced by said spring element is variable by said actuating drive moving said tappet in an adjusting stroke which is transmitted onto said lever by said actuator;

said tappet is guided in a manner protected against twisting, said actuating drive including a drive wheel driver by way of a screw gear and the adjusting stroke of said tappet is derived from rotation of said drive wheel by way of said screw gear;

wherein: said tappet is connected with a thread portion having an external thread; said thread portion having centrally arranged in a thread sleeve and meshes with the internal thread of said thread sleeve, and said thread sleeve is connected with said drive wheel in a manner protected against twisting;

wherein: said thread sleeve is symmetrically arranged to the center plane of said drive wheel, and, wherein: said drive wheel is rotatably guided in a bore of said gear housing by means of a cylindrical stud and at the other side by means of a cylindrical stud in a bore of an endshield secured in said gear housing in a manner protected against twisting; said gear housing being closed by a cap; and between said endshield and said cap is arranged a switch inside said gear housing, said switch being operable by way of a cam disk coupled with said cylindrical stud on said drive wheel in a manner protected against twisting.

* * * * *